Patented June 22, 1954

2,681,896

UNITED STATES PATENT OFFICE 2,681,896

FURFURYL ALCOHOL CONDENSATE

Erik R. Nielsen, Chicago, Ill.

No Drawing. Application October 18, 1952,
Serial No. 315,578

12 Claims. (Cl. 260—41)

This invention relates to furfuryl alcohol resin intermediates and more particularly to the formation of a furfuryl alcohol resin intermediate by the use of activated alumina, a neutral catalyst, and in the absence of acids.

Intermediates formed of furfuryl alcohol in accordance with the present invention are syrupy liquid to semi-solid tarry products of partial condensation and polymerization thereof which are useful as adhesives as well as coatings and as plastic bases for the preparation of coatings and molding compositions.

It is known in the art to produce furfuryl alcohol intermediates by heating, such as by refluxing furfuryl alcohol with an acid catalyst in the presence of a solvent which serves to moderate the potentially violent reaction, such solvent usually being water. The acid catalyzed polymerization of the furfuryl alcohol may be terminated at an intermediate stage of condensation. In forming such acid polymerized intermediate according to prior art practice, the furfuryl alcohol is carefully heated with the acid and the solvent until a viscous liquid is obtained, the reaction being stopped when an approximate predetermined viscosity is reached. The intermediate thus formed is separated from the solvent employed and is ordinarily diluted with monomeric furfuryl alcohol to lower the viscosity to a point where it becomes practical to stabilize the intermediate by neutralization or washing or both. Next, the intermediate is dried and is then suitable for application as a coating, casting resin, adhesive, cement or impregnant, depending upon the degree of polymerization effected, and the degree of dilution with monomeric furfuryl alcohol.

Such diluted intermediates, or intermediates taken only to a point of low viscosity, are too liquid to make possible a conversion into a molding powder by the addition of a reasonable amount of filler. To produce a molding powder, it becomes necessary to employ a highly viscous intermediate, from a heavy syrup to a stiff tar. Under those conditions it is difficult to wash out all of the acid and even when the wash water contains acid neutralizing agents, it is very difficult in view of the character of the intermediate to effect complete removal of the acidic catalyst. Such residual content of acid remaining, even in trace quantities, in the resin intermediates tends to continuously catalyze the polymerization of the intermediate in storage so that it is relatively unstable over necessary practical periods of storage. A molding powder prepared from such an intermediate has a shelf life too short to be practical. Thus the outstanding disadvantages of furfuryl alcohol intermediate resins obtained by acid catalysis are (1) that such intermediates cannot be converted into shelf-stable molding compounds, (2) that coatings, casting resins, cements, adhesives and impregnants based on such intermediates usually contain monomeric furfuryl alcohol as a diluent. The latter volatilizes in part during the ultimate setting of such products and may cause porosity in the finished product, and (3) that the acidic catalyst must be inactivated or removed, and the intermediate must be dried.

It is also known in the art that furfuryl alcohol over relatively long periods of time and with substantial amounts of heat applied will tend to polymerize and resinify without catalysts, but very slowly. Thus it is known (see Dunlop and Peters, Industrial and Engineering Chemistry, vol. 34, pages 814–817) that a slight dimerization, less than about 4%, takes place when furfuryl alcohol is heated to about 300° F. for about 3 hours. When the temperature is considerably raised above this, such as to about 482° F., heating for a similar period will dimerize less than about 20% of the furfuryl alcohol. Such method of heating without catalysts, it will be immediately apparent, is impractical as a commercial procedure, not only in view of the long time required, but also the inadequacy of the polymerization, since it goes less than 20% merely to a dimer stage in any practicable heating period such as 3 hours.

The condensation and polymerization reaction which takes place is approximately as follows:

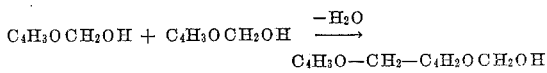

It will be noted that the product produced has an open alcohol radical which is available for further condensation and polymerization and it is assumed that under the slow polymerization conditions mentioned above some trace quantities of higher polymer may be formed. However, the reaction is so incomplete and goes so slowly as to be commercially useless.

Inasmuch as the condensation and polymerization is a dehydration, the quantity of water withdrawn becomes a measure of the degree of polymerization. However, as the polymerization proceeds according to the equation set forth above, it will be apparent that as higher and higher polymers are formed, the quantity of water released will be progressively less. For example, the same amount of water is withdrawn when two long polymer chains are condensed as where only two molecules of furfuryl alcohol are dimerized.

According to the present invention I have found that this potentially violent reaction by acid catalysis can be accelerated to take place substantially smoothly and at a reasonably rapid rate, by carrying out the reaction in the presence of activated gamma alumina as a catalyst and at a temperature in the range of 212° to 500° F., preferably at the approximate boiling point of furfuryl alcohol. Gamma alumina is characterized by being a distinct form of alumina, activated to the gamma form by heating the same aluminous material as is conventional in the formation of aluminas but to a critical temperature range, such as from about 700° to 1,100° F. Gamma alumina has a distinct crystalline structure as compared, for example, to alpha alumina which, starting with the same material, has not been heated to the same degree. Moreover, even within this critical temperature range to form an activated alumina the activated aluminas formed will vary in activity as a catalyst for the polymerization of the present invention where the catalyst has been heated to different temperatures.

The most active gamma alumina for my purpose is an active alumina which has been prepared by heating neutral hydrous alumina from about 900° to 1,100° F., preferably about 1,000° F. The difference of activities of the active aluminas commercially available shows up as taking a longer or shorter period to effect the desired catalytic furfuryl alcohol dehydration. Thus, for example, a substantially pure activated gamma alumina which has been heated to about 1,000° F. may take as little as one half the time of reaction necessary to effect the same degree of condensation as an active alumina which has been activated by heating to about 800° F.

Where the activated alumina contains other forms of alumina such as alpha alumina its activity is substantially decreased depending upon the quantity of this inactive alumina which is present. For example, an activated alumina which is a mixture with more than about 50% of inactive alpha alumina will have lost its catalytic activity substantially entirely. With less than about 50% of inactive alpha alumina the mixture of alpha and gamma aluminas is useful in accordance with the present invention. And the utility increases as the concentration of gamma alumina increases.

The activated alumina is available commercially in various particle sizes varying from fine dust or the so-called "fluid" activated alumina to coarse fragments up to about 2 inches.

I prefer to use the activated alumina in a particle size range of 8 to 14 mesh since with that material the reaction is effected most rapidly. The reaction is slower using particle sizes both above and below this range. For example, when the ¼ inch fragment size is used, it takes about twice as long to effect the same degree of condensation and polymerization. The same effect is observed when considerably finer particles are used such as the so-called "fluid" activated alumina where 40% to 60% is a fine dust of a particle size of 200 to 300 mesh. An additional advantage of the preferred range of particle size is that they are readily recovered after the reaction by screening the same out of the viscous intermediate. Thus while any particle size will operate over a greater or less practical heating period according to the present method, the preferred range stated has substantial advantage.

While not intending to be limited by any theory of operation the catalyst, the gamma alumina used herein, analogous to other catalytic phenomena, appears to have its activity available primarily as a surface activity. For this reason, inasmuch as the reaction which takes place is a dehydration, the moisture dehydrated from the furfuryl alcohol in the condensation thereof to polymers appears to be adsorbed on the surface of the catalyst.

To effect the reaction in accordance with the method of the present invention, the heating of the furfuryl alcohol is carried out as a continuous distillation thereof in the presence of the catalyst, whereby the moisture adsorbed by the catalyst is azeotropically withdrawn with the volatilizable furfuryl alcohol, thus continuously reactivating the catalyst to maintain the surface thereof relatively moisture free.

The furfuryl alcohol distilled will carry over most of the moisture and, after a minimum quantity of dimerization is effected therein, the dimer being water insoluble, the furfuryl alcohol continuously distilled with its dimer allows continuous separation of the water in which the furfuryl alcohol-dimer mixture is insoluble. Thus as the dimer and higher polymers are formed in the heating and distillation, the simultaneously formed water normally separates therefrom as a layer. Thus this method is readily practiced by adding the catalyst to the furfuryl alcohol and distilling the same, while recycling the furfuryl alcohol and trapping off the water in a trap.

Alternatively, of course, water insoluble solvent, volatile in the desirable temperature range for evaporating water and furfuryl alcohol, may be used for azeotropic removal of the water of dehydration. Thus for example toluene, xylene and commercial aromatic hydrocarbon solvents may be used as the azeotropic solvent.

However, as indicated, no solvent is actually necessary because the furfuryl alcohol may act as its own medium for azeotropic removal of water. Such may be effected by continuous reflux or recycling of the furfuryl alcohol and trapping off the moisture evaporated therewith.

It will be apparent, since the catalyst is continuously renewed by removal of moisture, and the activity thereof depends somewhat upon the surface exposure thereof to the furfuryl alcohol reacting, that considerable variation in activity is present with the particle size of the activated alumina used. Thus I have found that, while an azeotropic distillation carried out with reflux and trapping off of water over a period of an hour to 2 hours, usually about 1⅔ hours, suffices to substantially completely dehydrate the moisture, with the activated alumina in the particle size range of about 8 to 14 mesh, where larger or smaller particles are used, as mentioned above, the reaction is considerably slower and takes about twice this time.

The quantity of water trapped off in the continuous azeotropic distillation serves as a measure for the degree of polymerization. Thus while in the earlier dimerization stage substantially larger quantities of water will be withdrawn and the quantity of water coming over in later stages of polymerization will be less, yet the absolute quantity of water serves as a measure of the degree of polymerization that has taken place. This approximate measure of the quantity of water trapped off for the degree of polymerization is in contrast with prior art methods of merely measuring the viscosity of the syrup obtained, although that also may be used as a measure in this case of the degree of polymerization, if desired.

Thus, according to the present method, the furfuryl alcohol is distilled alone or in the presence of an azeotropic solvent with water and the water removed is continuously trapped off. The distillation usually takes place in the presence of a quantity of approximately 5 to 20%, usually about 10%, of active alumina based upon the weight of the furfuryl alcohol. For most purposes, about 8 to 12% of activated alumina suffices. Somewhat greater activity is present where larger quantities substantially exceeding 12% of active alumina are used, and where substantially less than 8% is used, such as about 5%, the reaction goes considerably slower.

The following examples illustrate the practice of this invention:

*Example 1*

65 grams of technical furfuryl alcohol dried over sodium sulfate is placed in a distilling flask together with 6.5 grams of gamma alumina, which is an activated alumina which has been heated at about 1,000° F. and used in particles of about 8-14 mesh sizes available as "grade F-10" from Aluminum Company of America. The distilling flask is connected to a liquid trap and condenser, the standard apparatus used in azeotropic distillation for separation of water as an azeotrope with a liquid heavier than water, the water from the condenser being allowed to run over the outside of the trap, thereby cooling it. The distilling flask was heated to the approximate boiling point of the furfuryl alcohol and the trap became filled with liquid distilled over, but since the furfuryl alcohol distilled at this stage is monomeric and soluble in water no water was separated therefrom. However, in about 20 minutes after distillation was begun, as the furfuryl alcohol began to dimerize, it became less miscible with water and after this period two layers, water and furfuryl alcohol containing dimer were formed, the furfuryl alcohol and dimer being returned to the distillation flask for further condensation. After about 50 minutes 6 cc. of water had been collected and after about an hour and 43 minutes 9.4 cc. of water had been collected and the distillation was then terminated. The hot fluid syrupy residue was poured through a coarse filter screen to remove the alumina and upon cooling became a highly viscous liquid. Only 6.8 grams of unreacted furfuryl alcohol remained, 58.8 grams having taken place in the reaction. Taking the water split out in the dehydration as a measure of the degree of condensation and polymerization in a manner similar to that described in the Dunlop and Peters publication referred to above, the reacted furfuryl alcohol was a polymer averaging 8 furan rings per chain. While this is a rough average, it serves to indicate that the activated alumina will effect substantial condensation in less than 2 hours and at lower temperatures where, as mentioned above, mere heating without catalyst for 3 hours at a temperature of 482° F. produces less than 20% of dimer. In the method hereof, substantially complete conversion to the dimer stage was effected in about 45 minutes.

*Example 2*

Similar quantities of the same materials as in Example 1 were again distilled for an hour and 41 minutes at which time 9.8 cc. of water were split out, 58.8 grams of the furfuryl alcohol had reacted and it is calculated that the resin intermediate formed, which was more highly viscous than the product of Example 1, had an average of 11 furan groups per molecule of polymer.

*Example 3*

The materials, as in Example 1 and in the same quantity, were again distilled for a period of 1 hour and 45 minutes, in which time 9.9 cc. of water were split out. In this case after screening of the alumina the residual polymer was a semi-solid tarry residue, the resin intermediate averaging about 12 furan groups per resin molecule.

The resinous intermediate polymer formed by the catalytic action with activated alumina hereof goes to an intermediate stage of completion. In the absence of other treatment, it will not further polymerize to a hard resin under any normal temperature conditions of storage, nor for any normal storage period, even when stored in the presence of the activated alumina catalyst with which it was produced. For example, even stored in the presence of the alumina catalyst comprising the most active type as described above, the intermediate remained unchanged over a period of over 3 months even with temperature variations as high as 100° F. Thus while it is desirable to remove foreign bodies such as the catalyst hereof for use of the liquid resin as an adhesive or in a coating composition to improve the purity and clarity thereof, such catalyst removal does not need to be absolute, nor in fact is it at all necessary to remove the catalyst beyond the general desirability of producing an emprically clear liquid resin having no obvious suspended impurities therein to enhance the appearance thereof.

Where the resin is to be used for molding purposes, it may have a filler material added thereto in sufficient quantity to absorb much or all of the liquid resin intermediate and may even have sufficient filler present (activated alumina) to reduce the liquid resin by adsorption to an empirically dry, free-flowing molding powder.

The ultimate setting of the resin as conventional for furfuryl alcohol intermediates is effected by the addition of acid thereto just prior to use. Alternatively, as known in the art, an empirically non-acidic catalyst may be added thereto of a type which may generate acid with heat such as an acid anhydride, i. e. maleic anhydride, or other organic materials capable of being converted to acid by hydrolysis may be incorporated with stability in the resin intermediate, and stored therewith until ready for use, the ultimate polymerization to firmly set the resin being effected by heat or other polymerizing procedures to release the acid.

It will be apparent from the foregoing that any inert filler material may be mixed with the resin depending upon the ultimate use intended. Such filler material is characterized by neutrality, i. e. having no free acid, whereby it will not affect the stability of the intermediate until it is desired to set the resin either by heat, where acid may be generated from a potentially acidic component therein, or by merely adding acid to the resin to effect final polymerization. Thus the conventional inactive neutral fillers such as wood flour, bentonite, carbon, inert pigments, etc. may be added without affecting the stability. Where the resin is to be set by its potential acid generating activity, small quantities of an acid anhydride may be added alone or together with the filler. Alternatively, as indicated, the resin just prior to use may have incorporated therein a small quantity of an acid such as about 3% of acid as hydrochloric, sulfuric or phosphoric acids, and up to 10% or more of weaker acids such as dibasic organic acids, i. e. oxalic or maleic acids. Alternatively, of course, acidic salts or other acid-like substances may be used. Obviously, the filler may serve as an acid carrier and for such purpose the liquid resin would be compounded with only part of the filler to produce the molding powder, the remaining and minor part of the filler serving as a carrier for the acidic catalyst and being blended with the uncatalyzed molding powder prior to molding. Where the resin contains no filler and is to be used as a coating or casting composition, the usual practice is to mix the acid therewith, applying the same as a coating or effecting the casting thereof, allowing the same to cure for 2 or 3 hours at room temperature and finally slowly raising the temperature step-wise up to about 350° F.

I claim:

1. The method of condensing and polymerizing furfuryl alcohol to a stable intermediate stage comprising heating the furfuryl alcohol in the presence of activated alumina until a substantial portion of water released by condensation is vaporized.

2. The method of polymerizing and condensing furfuryl alcohol to a stable intermediate stage comprising continuously distilling the furfuryl alcohol in the presence of activated alumina to vaporize the water released by condensation thereof, and returning the volatilized furfuryl alcohol to the reaction mixture until a stable intermediate condensation and polymerization product is obtained.

3. The method of condensing and polymerizing furfuryl alcohol to a stable intermediate stage of condensation comprising dissolving the furfuryl alcohol in a volatile solvent miscible therewith and azeotropically distilling the mixture in the presence of activated alumina to remove water of condensation, until a stable intermediate condensation and polymerization product is obtained.

4. The method of condensing and polymerizing furfuryl alcohol to a stable intermediate stage comprising distilling the furfuryl alcohol in the presence of at least 5% of activated alumina while continuously removing the water of condensation produced in the reaction, until a stable intermediate condensation and polymerization product is obtained.

5. The method of condensing and polymerizing furfuryl alcohol to a stable intermediate stage comprising distilling the furfuryl alcohol with at least 5% of activated alumina which has been activated by heating alumina to a temperature range of 700 to 1,100° F., until a stable intermediate condensation and polymerization product is obtained.

6. The method of condensing and polymerizing furfuryl alcohol to a stable intermediate stage comprising distilling the furfuryl alcohol in the presence of at least 5% of particles of an activated alumina having an average screen mesh size in the range of about 8 to 14, said activated alumina having been formed by heating the alumina to a temperature in the approximate range of 700 to 1,100° F., until a stable condensation and polymerization product is obtained.

7. The method of condensing and polymerizing furfuryl alcohol to a stable intermediate stage comprising distilling furfuryl alcohol in the presence of about 10% of activated alumina particles having an average screen mesh size in the approximate range of 8 to 14 mesh which has been activated by heating the alumina to a temperature of approximately 1,000° F., until a stable intermediate product is obtained having an average of about 12 furan rings per molecular chain.

8. The method of forming a furfuryl alcohol resin comprising first condensing and polymerizing furfuryl alcohol to a stable intermediate by heating the furfuryl alcohol with activated alumina while simultaneously evaporating the water of condensation, and then setting the stable intermediate thus formed by adding an acidic substance thereto.

9. A stable intermediate condensation and polymerization product of furfuryl alcohol containing an average of about 12 furan rings per molecular chain formed by distilling furfuryl alcohol in the presence of activated alumina.

10. A stable intermediate condensation and polymerization product of furfuryl alcohol formed by distilling furfuryl alcohol in the presence of activated alumina, said product containing from about 5 to 20% of activated alumina.

11. The method of condensing and polymerizing furfuryl alcohol to a stable intermediate stage of condensation comprising dissolving the furfuryl alcohol in a volatile solvent miscible therewith and azeotropically distilling the mixture in the presence of activated alumina which has been activated by heating alumina to a temperature range of about 700 to 1100° F., to remove water of condensation, until a stable intermediate condensation and polymerization product is obtained.

12. The method of condensing and polymerizing furfuryl alcohol to a stable intermediate stage comprising distilling the furfuryl alcohol in the presence of at least 5% of activated alumina which has been activated by heating alumina to a temperature range of about 700 to 1100° F., while continuously removing the water of condensation produced in the reaction, until a stable intermediate condensation and polymerization product is obtained.

No references cited.